US008875160B2

(12) United States Patent
Hunt et al.

(10) Patent No.: US 8,875,160 B2
(45) Date of Patent: Oct. 28, 2014

(54) DYNAMIC APPLICATION MIGRATION

(75) Inventors: Galen C. Hunt, Bellevue, WA (US);
Reuben R. Olinsky, Seattle, WA (US);
Adam B. Anderson, Boston, MA (US);
Paul G. Mayfield, Alpine, UT (US);
William Street, Orem, UT (US); Russell T. Young, Pleasant Grove, UT (US);
Barry Bond, Redmond, WA (US);
Andrew A. Baumann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 158 days.

(21) Appl. No.: 13/345,031

(22) Filed: Jan. 6, 2012

(65) Prior Publication Data
US 2012/0227058 A1 Sep. 6, 2012

Related U.S. Application Data

(60) Provisional application No. 61/449,072, filed on Mar. 3, 2011.

(51) Int. Cl.
*G06F 13/00* (2006.01)
*G06F 9/455* (2006.01)
(52) U.S. Cl.
CPC .. *G06F 9/45558* (2013.01); *G06F 2009/45575* (2013.01)
USPC .................................................. 719/319; 718/1
(58) Field of Classification Search
CPC ............................ G06F 9/45533; G06F 9/541
USPC ................................................ 718/1; 719/319
See application file for complete search history.

(56) References Cited

U.S. PATENT DOCUMENTS

| 7,627,728 | B1 | 12/2009 | Roeck et al. |
| 7,886,183 | B2* | 2/2011 | Krishnan et al. ............. 714/5.11 |
| 8,019,861 | B2* | 9/2011 | Ginzton ........................ 709/224 |
| 8,195,774 | B2* | 6/2012 | Lambeth et al. ............. 709/220 |
| 2007/0250838 | A1 | 10/2007 | Belady et al. |
| 2008/0127182 | A1* | 5/2008 | Newport et al. .................. 718/1 |
| 2009/0210871 | A1 | 8/2009 | Dechovich |
| 2009/0265706 | A1 | 10/2009 | Golosovker et al. |
| 2010/0180275 | A1 | 7/2010 | Neogi et al. |
| 2010/0211956 | A1 | 8/2010 | Gopisetty et al. |
| 2012/0291094 | A9* | 11/2012 | Forrester et al. .................. 726/3 |
| 2013/0060947 | A1* | 3/2013 | Nelson .......................... 709/226 |

OTHER PUBLICATIONS

Chahal, et al., "Testing Live Migration with Intel® Virtualization Technology FlexMigration", Retrieved at <<http://download.intel.com/it/pdf/Testing_Live_Migration_with_FlexMigration.pdf>>, White Paper, Jan. 2009, pp. 12.

(Continued)

*Primary Examiner* — Andy Ho
(74) *Attorney, Agent, or Firm* — Dan Choi; David Andrews; Micky Minhas

(57) ABSTRACT

A library operating system is employed in conjunction with an application in a virtual environment to facilitate dynamic application migration. An application executing in a virtual environment with a library operating system on a first machine can be suspended, and application state can be captured. Subsequently, the state can be restored and execution resumed on the first machine or a second machine.

19 Claims, 6 Drawing Sheets

(56) References Cited

OTHER PUBLICATIONS

Clark, et al., "Live Migration of Virtual Machines", Retrieved at <<http://citeseerx.ist.psu.edu/viewdoc/download? doi=10.1.1.138. 4067&rep=rep1&type=pdf>>, Proceedings of the 2nd Symposium on Networked Systems Design & Implementation (NSDI), vol. 2, May 2005, pp. 273-286.

"Amazon Elastic Compute Cloud (EC2)", Retrieved at <<http://aws.amazon.com/ec2/>>, 2006, pp. 22.

Ammons, et al., "Libra: A Library Operating System for a JVM in a Virtualized Execution Environment", Retrieved at <<http://citeseerx.ist.psu.edu/viewdoc/download?doi=10.1.1.152.4632&rep=rep1&type=pdf>>, International Conference on Virtual Execution Environments (Co-Located with FCRC 2007 Conference), Jun. 13-15, 2007, pp. 11.

Anderson, Thomas E., "The Case for Application-Specific Operating Systems", Retrieved at <<http://ieeexplore.ieee.org/stamp/stamp.jsp?tp=&arnumber=275682>>, Third Workshop on Workstation Operating Systems, Apr. 23-24, 1992, pp. 92-93.

Appavoo, et al., "Providing a Linux API on the Scalable K42 Kernel", Retrieved at <<http://citeseerx.ist.psu.edu/viewdoc/download;jsessionid=152BE75DCC39E4C7F0C92245173F2A3F?doi=10.1.1.9.1395&rep=rep1&type=pdf>>, Proceedings of the FREENIX Track: USENIX Annual Technical Conference, Jun. 9-14, 2003, pp. 14.

Barham, et al., "Xen and the Art of Virtualization", Retrieved at <<http://www.cl.cam.ac.uk/research/srg/netos/papers/2003-xensosp.pdf>>, Proceedings of the nineteenth ACM symposium on Operating systems principles, Oct. 19-22, 2003, pp. 14.

Baumann, et al., "The Multikernel: A New OS Architecture for Scalable Multicore Systems", Retrieved at <<http://www.sigops.org/sosp/sosp09/papers/baumann-sosp09.pdf>>, Proceedings of the ACM SIGOPS 22nd symposium on Operating systems principles, Oct. 11-14, 2009, pp. 1-20.

Bhattiprolu, et al., "Virtual Servers and Checkpoint/Restart in Mainstream Linux", Retrieved at <<http://lxc.sourceforge.net/doc/sigops/appcr.pdf>>, ACM SIGOPS Operating Systems Review—Research and developments in the Linux kernel, vol. 42, No. 5, Jul. 2008, pp. 104-113.

Bugnion, et al., "Disco: Running Commodity Operating Systems on Scalable Multiprocessors", Retrieved at <<http://citeseerx.ist.psu.edu/viewdoc/download?doi=10.1.1.157.8827&rep=rep1&type=pdf>>, ACM Transactions on Computer Systems, vol. 15, No. 4, Nov. 1997, pp. 412-447.

Chen, et al., "Setuid Demystified", Retrieved at <<http://www.cs.berkeley.edu/—daw/papers/setuid-usenix02.pdf>>, in Proceedings of the 11th USENIX Security Symposium, USENIX Association, 2002, pp. 20.

Cheriton, et al., "A Caching Model of Operating System Kernel Functionality", Retrieved at <<http://citeseerx.ist.psu.edu/viewdoc/download?doi=10.1.1.129.5864&rep=rep1&type=pdf>>, In Proceedings of the 1st USENIX Symposium on Operating Systems Design and Implementation, Nov. 1994, pp. 15.

Douceur, et al., "Leveraging Legacy Code to Deploy Desktop Applications on the Web", Retrieved at <<http://classes.soe.ucsc.edu/cmps223/Spring09/Douceur%2008.pdf>>, Proceedings of the 8th USENIX conference on Operating systems design and implementation, 2008, pp. 16.

Eiraku, et al., "Fast Networking with Socket-Outsourcing in Hosted Virtual Machine Environments", Retrieved at <<http://citeseerx.ist.psu.edu/viewdoc/download?doi=10.1.1.155.875&rep=rep1&type=pdf>>, Proceedings of the 2009 ACM Symposium on Applied Computing (SAC), Mar. 9-12, 2009, pp. 8.

Engler, et al., "Exokernel: An Operating System Architecture for Application-Level Resource Management", Retrieved at <<http://citeseerx.ist.psu.edu/viewdoc/download?doi=10.1.1.52.2893&rep=rep1&type=pdf>>, Proceedings of the fifteenth ACM symposium on Operating systems principles, Dec. 3 -6, 1995, pp. 1-17.

Franke, et al., "Fuss, Futexes and Furwocks: Fast Userlevel Locking in Linux", Retrieved at <<http://kernel.org/doc/ols/2002/ols2002-pages-479-495.pdf>>, In Proceedings of the Ottawa Linux Symposium, 2002, pp. 479-497.

Garfinkel, Tal., "Traps and Pitfalls: Practical Problems in System Call Interposition based Security Tools", Retrieved at <<http://www.stanford.edu/~talg/papers/traps/traps-ndss03.pdf>>, In Proceedings of the Network and Distributed Systems Security Symposium, 2003, pp. 14.

Malan, et al., "DOS as a Mach 3.0 Application", Retrieved at <<http://www.usenix.org/publications/library/proceedings/mach91/malan.pdf>>, Proceedings of the Usenix Mach Symposium, Nov. 1991, pp. 27-40.

Gupta, et al., "Difference Engine: Harnessing Memory Redundancy in Virtual Machines", Retrieved at <<http://cseweb.ucsd.edu/~vahdat/papers/osdi08-de.pdf>>, In Proceedings of the 8th USENIX Symposium on Operating Systems Design and Implementation, 2008, pp. 14.

Helander, Johannes., "Unix under Mach: The LITES Server", Retrieved at <<http://research.microsoft.com/pubs/146893/10.1.1.49.5448.pdf>>, Helsinki University of Technology, 1994, pp. 71.

Howell, et al., "Living Dangerously: A Survey of Software Download Practices", Retrieved at <<http://research.microsoft.com/pubs/131156/vmsurvey2.pdf>>, MSR-TR-2010-51, Microsoft Research, 2010, pp. 16.

"Escaping from Microsoft's Protected Mode Internet Explorer—Evaluating a Potential Security Boundary", Retrieved at <<http://www.verizonbusiness.com/resources/whitepapers/wp_escapingn-nicrosoftprotectedmodeinternetexplorer_en_xg.pdf>>, White Paper, 2010, pp. 8.

Leslie, et al., "The Design and Implementation of an Operating System to Support Distributed Multimedia Applications", Retrieved at <<http://ieeexplore.ieee.org/stamp/stamp.jsp?tp=&arnumber=536480>>, IEEE Journal on Selected Areas in Communications, vol. 14, No. 7, Sep. 1996, pp. 1280-1297.

Litzkow, et al., "Checkpoint and Migration of UNIX Processes in the Condor Distributed Processing System", Retrieved at <<http://research.cs.wisc.edu/techreports/1997/TR1346.pdf>>, Technical Report 1346, Apr. 1997, pp. 9.

Loscocco, et al., "Integrating Flexible Support for Security Policies into the Linux Operating System", Retrieved at <<http://www.nsa.gov/research/_files/publications/security_policies_linux_os.pdf>>, Proceedings of the FREENIX Track: 2001 USENIX Annual Technical Conference, Jun. 25-30, 2001, pp. 1-62.

Love, Robert., "Get on the D-BUS", Retrieved at <<http://www.ee.ryerson.ca/~courses/coe518/LinuxJournal/elj2005-130-D-BUS.pdf>>, Linux Journal, 2005, pp. 5.

"Internet Information Services 7.5", Retrieved at <<http://technet.microsoft.com/en-us/library/dd364124(WS.10).aspx>>, Mar. 24, 2009, pp. 4.

"Microsoft Application Virtualization (App-V)", Retrieved at <<http://www.microsoft.com/en-us/windows/enterprise/products-and-technologies/virtualization/app-v.aspx>>, 2006, pp. 2.

"Performance Tuning Guidelines for Windows Server 2008 R2", Retrieved at <<http://download.microsoft.com/download/8/F/9/8F9CB30B-1617-4CF8-8534-9C2AAA0117F4/Perf-tun-srv-R2.docx>>, Feb. 28, 2011, pp. 119.

"Remote Desktop Protocol: Basic Connectivity and Graphics Remoting Specification", Retrieved at <<http://download.microsoft.com/download/9/5/E/95EF66AF-9026-4BB0-A41D-A4F81802D92C/[MS-RDPBCGR].pdf>>, 2010, pp. 1-421.

Tucker, et al., "Solaris Zones: Operating System Support for Server Consolidation", Retrieved at <<http://www.usenix.org/event/vm04/wips/tucker.pdf>>, Proceedings of the 3rd Virtual Machine Research and Technology Symposium, May 6-7, 2004, pp. 2.

Roscoe, et al., "Hype and Virtue", Retrieved at <<http://people.intethz.ch/troscoe/pubs/hotos07-hype.pdf>>, Proceedings of the 11th USENIX workshop on Hot topics in operating systems, 2007, pp. 6.

Sapuntzakis, et al., "Virtual Appliances for Deploying and Maintaining Software", Retrieved at <<http://suif.stanford.edu/papers/lisa03-deploying-vap.pdf>>, Proceedings of the 17th Conference on Systems Administration (LISA), Oct. 26-31, 2003, pp. 15.

(56) References Cited

OTHER PUBLICATIONS

Soltesz, et al., "Container-based Operating System Virtualization: A Scalable, High-Performance Alternative to Hypervisors", Retrieved at <<http://nsg.cs.princeton.edu/publication/vserver_eurosys_07.pdf>>, Proceedings of the 2nd ACM SIGOPS/EuroSys European Conference on Computer Systems, Mar. 21-23, 2007, pp. 13.

Spear, et al., "Solving the Starting Problem: Device Drivers as Self-Describing Artifacts", Retrieved at <<http://www.cs.kuleuven.ac.be/conference/EuroSys2006/papers/p45-spear.pdf>>, Proceedings of the 1st ACM SIGOPS/EuroSys European Conference on Computer Systems, Apr. 18-21, 2006, pp. 45-58.

Sugerman, et al., "Virtualizing I/O Devices on VMware Workstation's Hosted Virtual Machine Monitor", Retrieved at <<http://www.usenix.net/publications/library/proceedings/usenix01/sugerman/sugerman.ps>>, Proceedings of the General Track: 2002 USENIX Annual Technical Conference, 2001, pp. 14.

Charles., "Mark Russinovich: Inside Windows 7", Retrieved at <<http://channel9.msdn.com/Shows/Going+Deep/Mark-Russinovich-Inside-Windows-7>>, Jan. 14, 2009, pp. 12.

"VMWare ThinApp.", Retrieved at <<http://www.vmware.comifiles/pdf/VMware-ThinApp-DS-EN.pdf>>, 2008, pp. 2.

Waldspurger, Carl a., "Memory Resource Management in VMware ESX Server", Retrieved at <<http://www.waldspurger.org/carl/papers/esx-mem-osdi02.pdf>>, ACM SIGOPS Operating Systems Review—OSDI '02: Proceedings of the 5th symposium on Operating systems design and implementation, vol. 36, No. SI, Dec. 2002, pp. 1-14.

Whitaker, et al., "Scale and Performance in the Denali Isolation Kernel", Retrieved at <<http://citeseerx.ist.psu.edu/viewdoc/download?doi=10.1.1.126.4917&rep=rep1&type=pdf>>, Proceedings of the 5th Symposium on Operating Systems Design and Implementation, Dec. 9-11, 2002, pp. 16.

Yee, et al., "Native Client: A Sandbox for Portable, Untrusted x86 Native Code", Retrieved at <<http://static.googleusercontent.com/external_content/untrusted_dlcp/research.google.com/en//pubs/archive/34913.pdf>>, 30th IEEE Symposium on Security and Privacy, May 17-20, 2009, pp. 1-15.

Zeldovich, et al., "Making Information Flow Explicit in HiStar", Retrieved at <<https://db.usenix.org/events/osdi06/tech/full_papers/zeldovich/zeldovich.pdf>>, 7th Symposium on Operating Systems Design and Implementation (OSDI'06), Nov. 6-8, 2006, pp. 263-278.

U.S. Appl. No. 12/834,895, filed Jul. 13, 2010, Hunt et al.
U.S. Appl. No. 13/215,244, filed Aug. 23, 2011, Bond et al.
U.S. Appl. No. 13/331,078, filed Dec. 20, 2011, Hunt et al.

* cited by examiner

DYNAMIC APPLICATION MIGRATION

CROSS-REFERENCE TO RELATED APPLICATIONS

This application claims the benefit of U.S. Provisional Application No. 61/449,072, filed Mar. 3, 2011, and entitled "LIBRARY-OPERATING-SYSTEM PACKAGING-MODEL SCENARIOS," and is incorporated in its entirety herein by reference.

BACKGROUND

A library approach to operating system (OS) construction was championed by several operating system designs in the 1990s. The idea of the library OS is that the entire personality of the OS on which an application depends runs in its address space as a library. An OS personality is the implementation of the OS's application programming interfaces (APIs) and application visible semantics—the OS services upon which applications are built. Early proponents of the library OS approach argued primarily that the library OS could enable better performance through per-application customization. For example, a disk-I/O bound application with idiosyncratic file access patterns can realize better performance by using a custom file-system storage stack rather than using default sequential prefetching heuristics.

Like many of its contemporaries, the library OS approach is largely forgotten, a casualty of the rise of the modern virtual machines. While most new OS designs of the time, including library OS design, run only a handful of custom applications on small research prototypes, virtual machine systems proliferated because they could run major applications by reusing existing feature-rich operating systems. The performance benefits offered by library OS designs did not overcome the need for legacy compatibility.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to dynamic application migration. A library operating system can be employed in conjunction with an application within a virtual environment to facilitate application migration. The application can be suspended and state captured at a particular point in time. Later, application state can be restored and execution resumed on the same machine or a different machine. In one embodiment, the library operating system can perform application migration. Alternatively, migration can be performed outside the library operating system within the virtual environment or outside the virtual environment.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
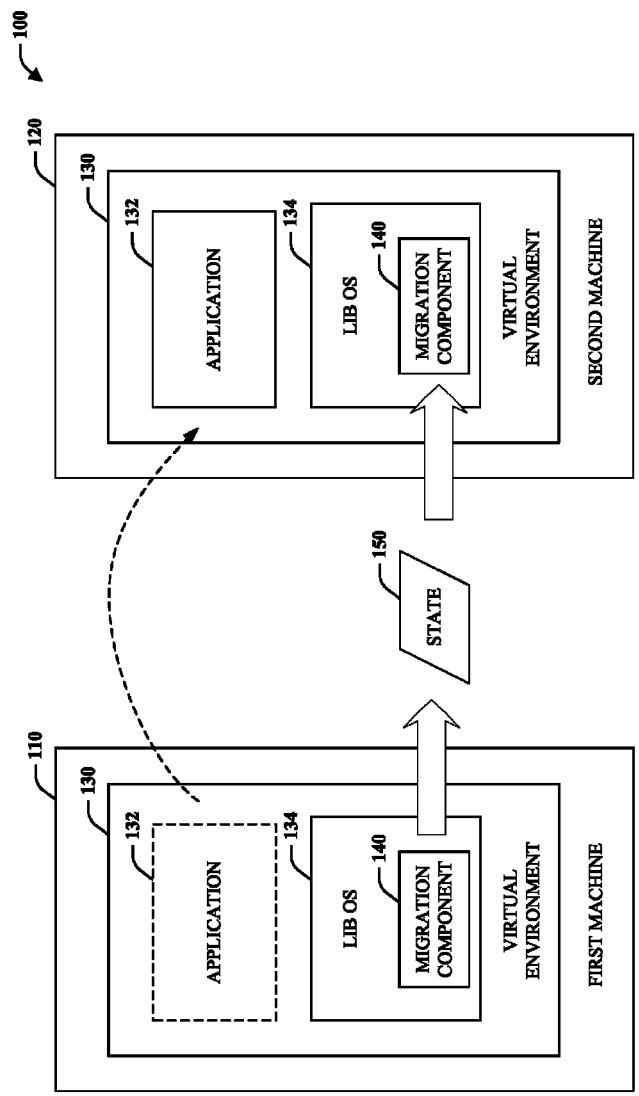
FIG. 1 is a block diagram of a dynamic application migration system.

Details below are generally directed toward dynamic application migration. For instance, a running application can be picked up and moved to execute on another machine. In another instance, a running application can be moved off a machine and after subsequently moved back to the same machine. This can be accomplished by saving the state of an application and utilizing that state to restart the application on a destination machine. Moreover, a library operating system can be employed with an application in a virtual environment to facilitate application migration.

Virtual machines are a conventional technology utilized to perform migration. A virtual machine is a software implementation of a physical machine that operates and appears to clients has if it is a physical machine. Similar to a physical machine, a virtual machine includes a full-fledged operating system (a.k.a., guest operating system) on top of virtualized hardware (e.g., virtual CPU, virtual memory, virtual hard disk . . . ) over which the operating system and a plurality of applications operate. Migration is generally performed by hibernating a virtual machine, cloning the virtual machine, copying the cloned virtual machine to a destination machine, and restarting the virtual machine on the destination. Various techniques can be employed to improve performance of conventional virtual machines, for example by making transitions faster. Nevertheless, virtual machines are heavyweight by nature, often occupying many gigabytes and consuming significant resources. More specifically, migrating a virtual machine can involve moving state of multiple applications, an operating system, as well as a virtual hard disk. As a result, migration can take several minutes or even hours with a slow connection. Further, large resource overhead makes migrating virtual machines to conventional consumer machines, such as desktops, laptops, tablets, or cellphones, impractical. In addition to the large size, a virtual machine can require quite a bit of processing power and memory to run, which can slow down a machine and, where applicable, drain battery power. Further, virtual machine migration is cost prohibitive even when powerful machines, like servers, are involved. In fact, it is often cheaper to shut down a virtual machine and start a new virtual machine at a destination than it is to migrate a virtual machine to the destination. Still further, there is no way to select particular applications to migrate. Rather, migration involves an entire machine including all applications that sit on top of the machine's operating system.

Another approach is to develop applications to support migration, which save their state. However, this approach has several problems. First, migration can occur solely with applications developed with migration in mind. Second, such applications are designed with respect to a particular operating system on a desktop, laptop, or phone, for example. As a result, there is insufficient isolation between the application and the host environment to move applications to diverse machines. Further, this approach is extremely error prone as it is easy for a developer to overlook some state that should be saved, and state can be lost. The term for this is "application amnesia," which is where an application cannot be resumed on another machine because requisite state has not been saved.

Employment of migration utilizing a library operating system with an application in a virtual environment remedies issues associated with conventional migration techniques, among other things. First, a library operating system is a fraction of the size of a full-fledged operating system employed by a conventional virtual machine. Accordingly, many applications can be run in separate virtual environments with little resource overhead. Migration can also take place on a per-application basis rather than a set of applications running on a virtual machine. Additionally, applications need not be designed to support migration, and can be isolated from a host environment enabling migration with respect to diverse machines.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a dynamic application migration system 100 is illustrated. As shown, there are two machines, namely first machine 110 and second machine 120. In one instance, a machine can be a physical machine such as a computer, as defined herein. By way of example, and not limitation, the first machine 110 can be a desktop computer and the second machine 120 can be a laptop computer, a tablet, or cell phone. Alternatively, a machine can correspond to a conventional virtual machine running one top of a physical machine. Within the first machine 110 is a virtual environment 130, which is a state isolation container for application execution. In other words, a first application is isolated from other applications such that the state of the first application can be identified and separated from the state of the other applications or the state of its host. Inside the virtual environment 130 is application 132 and library operating system 134 (which can be a "component" as defined herein). The application 132 can be any software program and need not be designed to support migration. As will be discussed further below, a library operating system is a subset of an operating system that includes application services (e.g., frameworks, rendering engines, common user interface controls, language runtimes . . . ) to enable application execution and runs in an application's address space as a library.

With conventional virtual machines there is a significant redundancy related to virtual hardware. For example, a conventional virtual machine creates a virtual network interface card (NIC), a virtual hard disk, a virtual controller, a virtual CPU, and other resources. On top of the hardware virtualization layer there is an operating system kernel that runs inside the guest operating system. A major role of the kernel and device drivers in the guest operating system is to create abstract resources such as threads, private virtual memory, and network sockets. A library operating system can enable elimination of those two redundant layers. More specifically, rather than employing a layer of hardware virtualization and a layer above it of hardware abstraction, basic primitives can be utilized from a host operating system. For instance, thread and virtual memory primitives of a host operating system can be employed. Code concerning bookkeeping about hardware and its state is unused and is thus removed. In other words, a library operating system can reduce the amount of code to the minimum needed to run an application. By way of example, a library operating system may require 64 MB of storage space compared to 2-4 GB for a conventional full-featured operating system. In memory, the overhead can be 16 MB of virtual memory compared to 128-512 MB of physical memory for a conventional operating system. The smaller size allows a single physical or virtual machine to include a large number of applications with library operating systems or instances thereof. For example, all applications on a physical machine can be run in a virtual environment with compatible library operating systems.

A library operating system can be generated by refactoring a conventional operating system in a particular manner. More specifically, in one instance, application services (e.g., frameworks, rendering engines, common user interface controls, language runtimes . . . ) can be packaged in a library operating system and user services (e.g., graphical window manager, clipboard, search indexers . . . ) and hardware services (e.g., OS kernel, device drivers, file systems . . . ) are packaged with a host operating system. In one instance, a library operating system can be produced that is $\frac{1}{50}^{th}$ the size of the full operating system. This library operating system is distinct from previous library operating systems designs, which aimed to provide application customized performance enhancement by exposing low-level hardware abstractions to applications. These previous designs provide applications with fine-grained, customized control of hardware resources such as page tables, network packets, and disk blocks (e.g., Exokernel, Cache Kernel, and Nemesis). Here, the library operating system employed differs in its goals (e.g., state isolation, host independence, and migration) and thus offers higher-level abstractions. These higher level-abstractions make it easier to share underlying host operating system resources such as buffer caches, file systems, and networking stacks with a library operating system.

The library operating system 134 can include migration component 140. The migration component 140 is configured to migrate an executing application (a. k. a., a process) from the first machine 110 to the second machine 120. With respect to the first machine 110, the migration component 140 can capture application state 150 at a particular point in time including, for example, execution state, memory state, transaction state, open network connections, or any other suitable state data to enable execution of application 132 to be resumed. Upon receipt of the state 150, the migration component 140 on the second machine 120 can restore the state and resume application execution. In other words, the application 132 can be hibernated or dehydrated on the first machine 110 and resumed from hibernation or rehydrated on the second machine 120. In accordance with one embodiment, the library operating system 134 can be migrated with the application 132. Alternatively, the application 132 can simply identify a compatible library operating system to be bound to the application on a destination machine. Furthermore, although illustrated inside the virtual environment 130 and more specifically the library operating system 134, the migration component 140 can alternatively operate outside the library operating system 134 within the virtual environment or outside the virtual environment, for example as part of a host operating system.

The state 150 can correspond to what is also referred to as an application snapshot of an applications state at a particular time, or simply a snapshot. More generally, the state can simply provide data needed to later resume execution of the application from a point it stopped to provide continuous computation across machines. Various optimizations can be employed with respect to state 150 as well and will be recognized by those of skill in the art upon reading this description. By way of example, and not limitation, rather than capturing all state, the state 150 can capture differences in state from when the application was loaded to its current state. In other words, "dirty pages" of memory can be captured. Subsequently, on a destination machine, like the second machine 120, the application can be loaded then modified in accordance with the state 150.

Further, there are different ways of making the state 150 available to a destination machine. For instance, the state 150 can be transmitted from a source machine to a destination machine. Alternatively, the state 150 can be saved to a persistent/non-volatile store accessible by both the source machine and the destination machine. Still further yet, the state 150 can saved to portable computer-readable storage medium or smaller device and physically provided from a source machine to a destination machine. For example, a uniform serial bus (USB) flash drive or a phone can be utilized to courier the state between environments.

Figure 2:
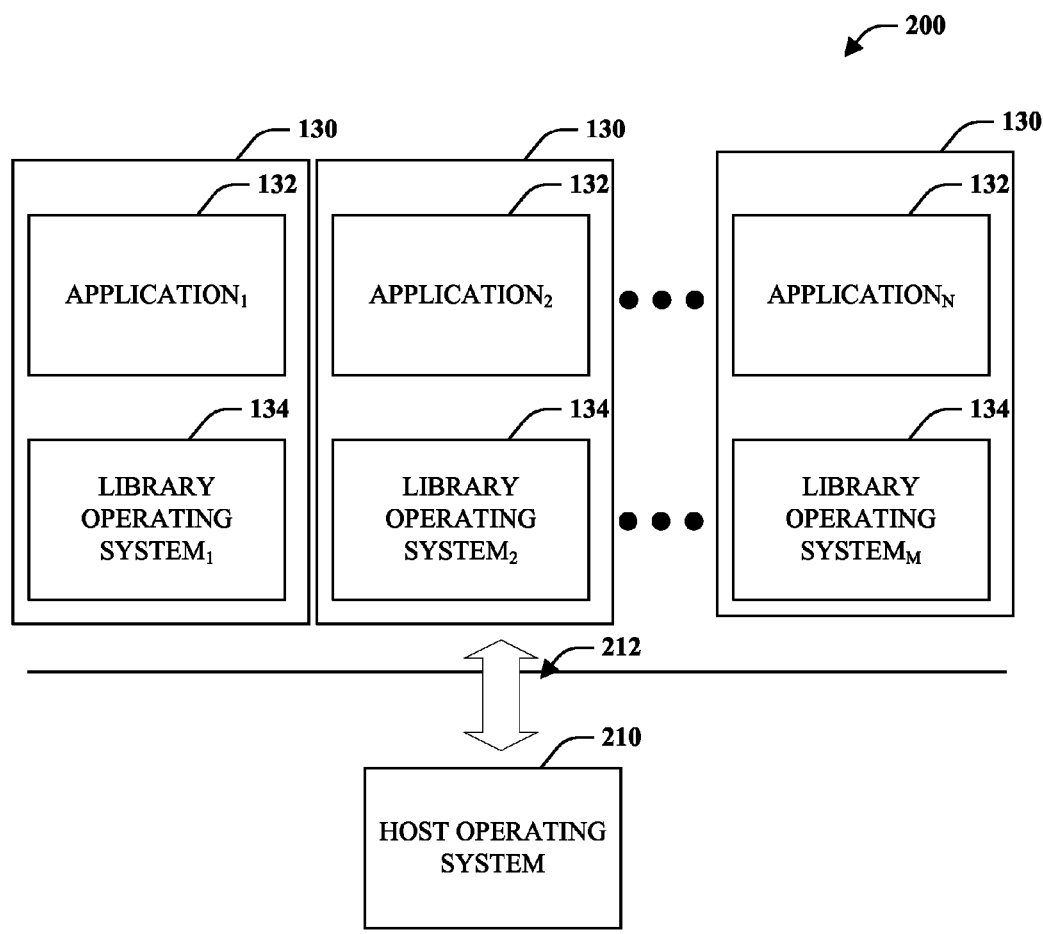
FIG. 2 is a block diagram of an exemplary library-operating system architecture.

Turning attention to FIG. 2, an exemplary library-operating system architecture 200 is illustrated. As shown, the architecture 200 includes host operating system 210, which is the primary operating system installed on a computer that interacts with physical hardware (e.g., central processing unit, memory . . . ). In many cases, the host operating system 210 is the sole operating system. Here, however, several library operating systems 134 (LIBRARY OPERATING SYSTEM$_1$-LIBRARY OPERATING SYSTEM$_M$, where M is a positive integer) are guests that operate over, or within, the host operating system 210. A number of applications 132 (APPLICATION$_1$-APPLICATION$_N$, where N is a positive integer) are executed over compatible library operating systems 134. Each of the plurality of library operating systems 134 captures the personality (e.g., application programming interfaces and applications semantics, upon which applications are built) of an operating system on which an application depends and can run in the application's address space as a library.

The architecture 200 resembles a conventional virtual-machine architecture, but rather than employing an entire operating system, a library operating system is employed. Resource overhead is thus dramatically reduced. For example rather than consuming 512 MB of random access memory (RAM) and 4 GB of disk space to run an entirely separate copy of an operating system, less than 16 MB of RAM and 64 MB of disk space can be consumed by a library operating system. In practice, a typical consumer device may only be able to run one or two copies of entire conventional operating system, which makes it difficult to run many different applications. However, by substituting a library operating system in place of a conventional operating system, many different applications requiring various versions of an operating system are supported quite easily.

In accordance with one embodiment, each combination of an application 132 and a library operating system 134 can operate within a virtual environment 130, called a picoprocess, which is lightweight, state isolation container built from an operating system process address space, but without access to the full services of a host operating system 210. In other words, applications can be sandboxed such that an ill-behaved application cannot compromise other applications or its host. Code running in the picoprocess can employ an interface 212 (e.g., application binary interface (ABI)) configured to enable interaction between a library operating system 134 (supplying applications services) and the host operating system 210 (supplying user and hardware services) represented by the arrow in FIG. 2. In one particular embodiment, the interface can be implemented by a platform adaptation layer (not shown) within a virtual environment 130 and a security monitor (not shown) within the host operating system. The interface enables virtualization of host operating system resources into an application while maintain a security isolation boundary between a library operating system 134 and host operating system 210. Although implementations of a platform adaptation layer and security monitor, for example, may vary, compatibility is maintained by adherence to an application binary interface contract. Stated differently, a consistent set of abstractions can be maintained across varying host operating system implementations, for instance. Accordingly, applications can be executed with respect to different instruction set architectures and different physical machine platforms. By way of example, an application able to be run on top of an x86 or x64 host can be migrated to an ARM host or possibly to a host running a completely different operating system. If the ABI contract is implemented, compatibility is ensured across these different hosts.

Figure 3:
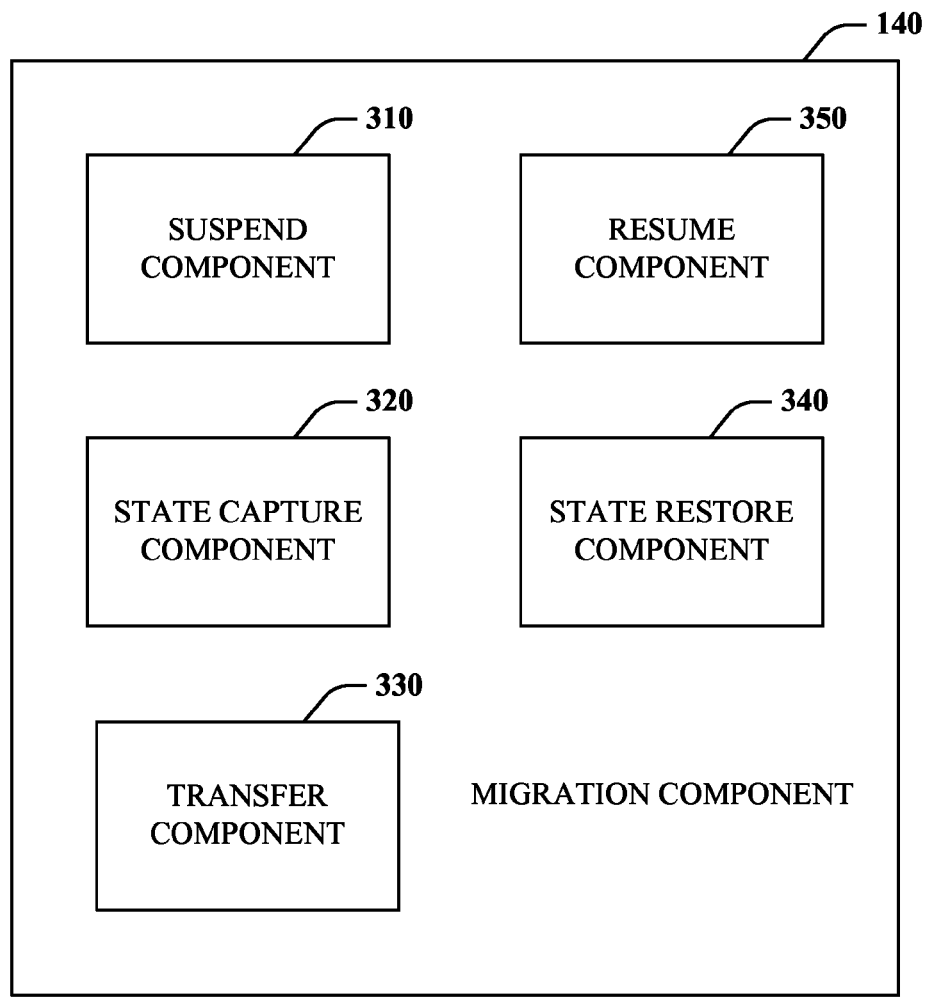
FIG. 3 is a block diagram of representative migration component.

Turning attention to FIG. 3, the migration component 140 is illustrated in further detail. In particular, the migration component 140 includes suspend component 310, state capture component 320, transfer component 333, state restore component 340, and resume component 350. What follows are descriptions of functionality afforded by components of the migration component 140. These descriptions will focus on a particular implementation in the context of a library operating system. Of course, other implementations are possible, and the claimed subject matter is not intended to be limited to one specific implementation.

The suspend component 310 is configured to suspend execution of an application. Once an application is running in a virtual environment, it is desirous to suspend execution to prepare for migration. For example, some external stimulus can be applied to the library operating system running inside the virtual environment indicating that a steady state should be approached. That is, any input or output is paused and threads stop doing work. This can involve ensuring that some part of the library operating system is able to preempt threads running in the process, or another approach is to have threads running inside the library operating system's environment check weather a steady state should be approached periodically or prior to execution. However accomplished, threads executing in the virtual environment can reach a steady state and pause.

The state capture component is configured to capture state associated with an application to enable execution to be resumed at a subsequent time, and possibly on a different machine. In one implementation, a thread can identify pages of virtual memory within the process and write out these pages of virtual memory to some persistent store. In an optimization, pages that have been modified since the application was loaded can be identified and written out to a persistent store. In this manner, static data that was loaded into the application that has not changed need not be written out to a persistent store. Additionally, a thread might inspect small pieces of state on the system that are not accessible through memory of a process. For instance, there are objects or resources that are accessible to the process but are not backed by memory that resides within the process address space. Accordingly, a thread can invoke some system calls to do some amount of work to capture present state of these resources that lie outside the process' purview. That data can also be written out to a persistent store. The complexity of the state outside the process address space is greatly reduced through the use of a library operating system because most of the state of the operating system related to the application is stored in the library operating system instead of in the host operating system. The state in the library operating system is captured within the pages of the process memory. Further, the state of a file system or virtual file system utilized by a virtual environment and typically outside a virtual environments process space can be captured can optionally be written to a persistent store. At this point, some amount of metadata can be written to the persistent store indicating what was captured and perhaps the version of the library operating system, amongst other useful pieces of information. The data written to the persistent store is now generally complete and constitutes a snapshot or suspended form of the application. The application itself can be terminated or in one particular instance resume executing threads and computations.

Various alternate embodiments including optimizations can be performed by or with respect to the suspend component 310 and state capture component 320. By way of example, and not limitation, the state can be captured while threads are currently running and prior to suspension thereof. Subsequently, upon suspension, it can be determined if any state (e.g., page of memory) was accessed or modified during capture, and if so, the state can be re-written. Since threads are not going to modify many pages, most pages can be transferred out while threads are still running, and at the last moment, pages that have been modified since last written out can be re-written. Accordingly, application execution can be extended.

The transfer component 330 is configured to make an application snapshot, or state, available to other machines, for example. In one instance, the transfer component can transmit state directly to a target/destination machine, for example over a network such as the Internet. Alternatively, the state can be saved to a data store accessible locally or remotely by both the current and destination machines, such as a network accessible data store. Still further yet, the state can be transferred physically by saving state to a portable computer-readable medium, such as a flash drive, or a portable machine such as cell phone.

The state restore component 340 is configured to restore application on a machine. In one implementation, a new virtual environment can be created as is ordinarily done for a new application except a notification can be provided to the library operating system that the instead of starting an application from scratch it is continuing execution of any application. As part of this notification, a pointer or the like can be provided to persistent data. The library operating system can then load metadata, contents of memory that were captured, and restore the contents of memory to the same locations (e.g., virtual addresses) as the previous system. The library operating system executing the state resume component 340 can also take data captured from resources outside of the address space of the virtual environment and create those resources, for example using system calls to arrive at the same state at which the resources were before a suspend occurred. Recreating resources can also include creating a number of threads that map to the same number of threads that were used previously. Additionally, the threads can be configured to use memory that they had previously used.

The resume component 350 is configured to resume execution of an application. For example with respect to the ongoing library operating system implementation, the resume component 350 can indicate to threads in the virtual environment that they should continue with their computations. At this point, each thread continues with the instructions following where it was suspended and the application continues to execute normally, until the application terminates or is migrated again.

Alternative implementations of the state restore component 340 and resume component 350 are possible and contemplated. For example, rather than waiting to load all state prior to resuming execution, a lazy implementation can be employed. Here, threads can be started with little or no state and that state, such as pages of memory, can be brought in on-demand, as threads need them.

Figure 4:
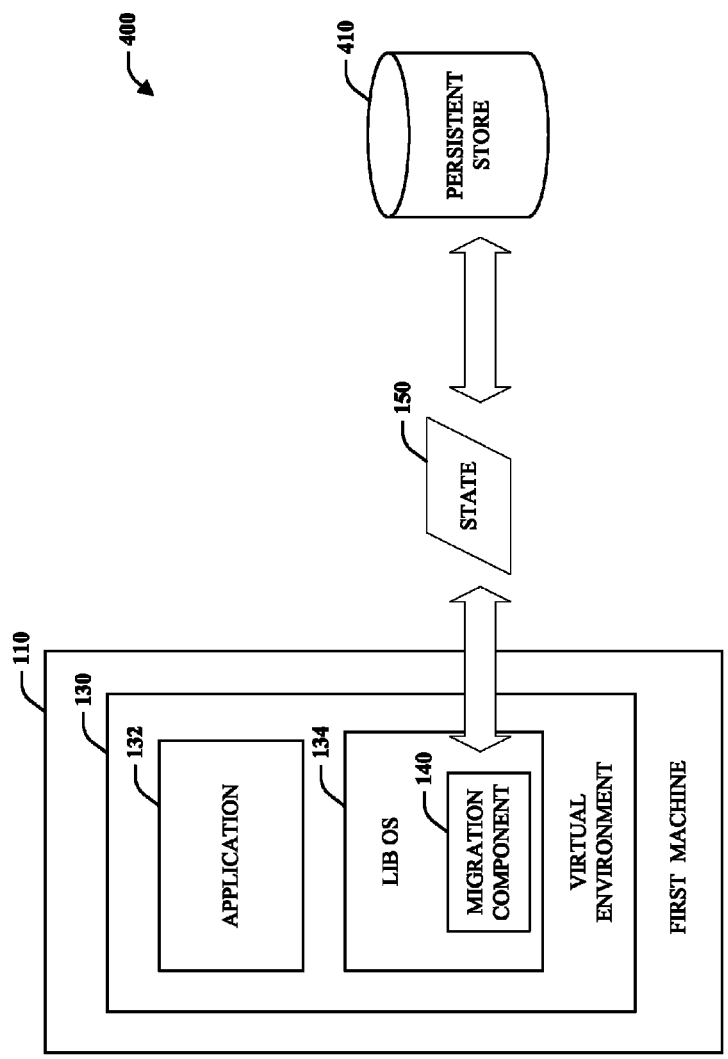
FIG. 4 is a block diagram of a dynamic application migration system.

FIG. 4 illustrates a dynamic application migration system 400. Similar to system 100, system 400 includes machine 110 including the virtual environment 130, the application 132, the library operating system 134, and the migration component 140. A special case of migration is shown in system 400, however, where migration occurs with respect to a single machine. The same mechanism employed to migrate an application between two different machines can be employed with respect to one machine. Here, the migration component 140 can be utilized to suspend execution and capture the state 150 of the application 132 operating in the virtual environment 130 with the library operating system 134. The state 150, or snapshot of the application, can be saved to persistent store 410, which is a non-volatile store that houses data in a manner that that outlives a process that creates the data, as opposed to housing date in volatile memory. In effect, the application is hibernated. Later, the migration component 140 can acquire the state 150 from the persistent store 410 and utilize the state 150 to restore state and resume execution of the application at the point it left off. Similar discussions regarding different implementations and optimizations are also applicable here. For example, in one instance the migration component 140 can operated outside the virtual environment, for instance as part of a host operating system.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the migration component 140 can utilize such mechanisms in determining or inferring when and how to migrate a running application.

Figure 5:
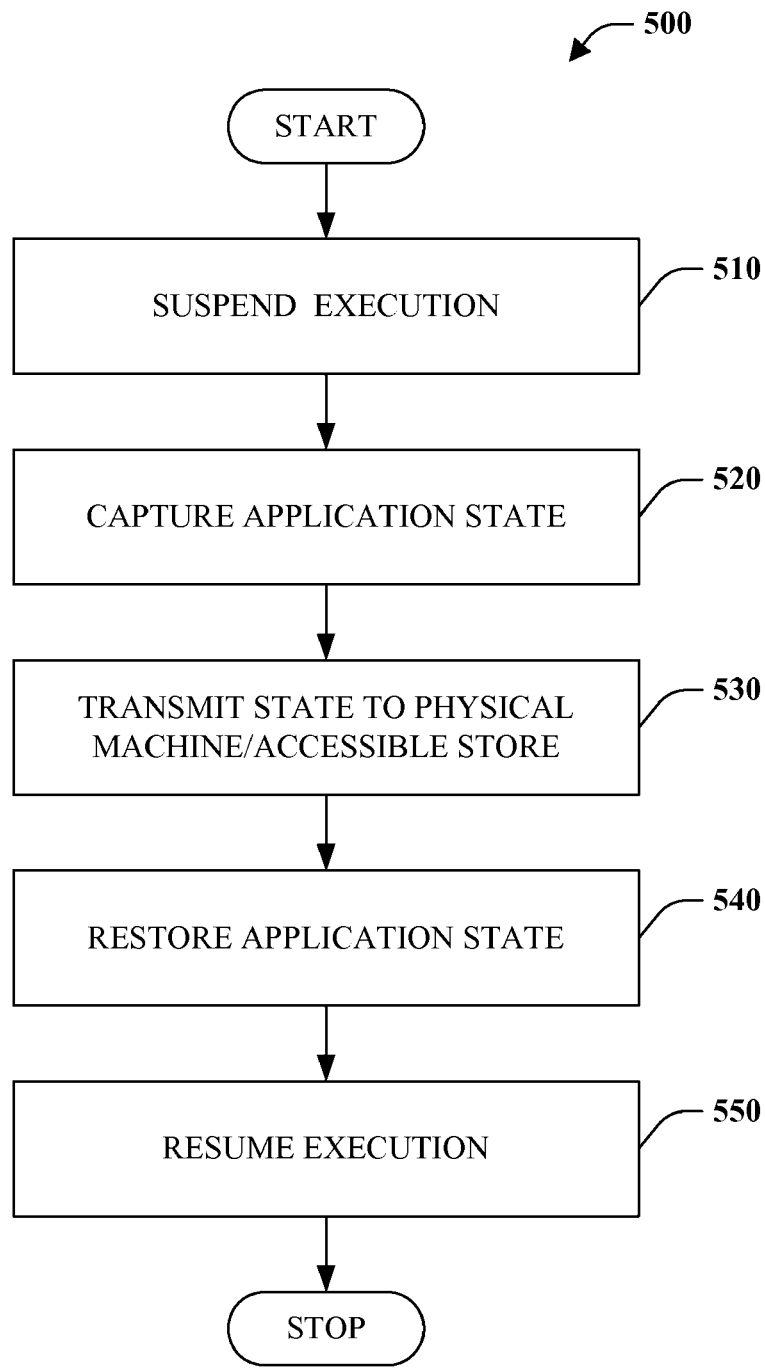
FIG. 5 is a flow chart diagram of a method of dynamic application migration.

In view of the exemplary systems described supra, methodologies that may be implemented in accordance with the disclosed subject matter will be better appreciated with reference to the flow chart of FIG. 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 5, a method 500 of dynamic application migration is illustrated. At reference numeral 510, execution of an application running inside a virtual environment with library operating system is suspended. In this manner, the application can approach a steady state for example by pausing input and output operations as well as thread work. At numeral 520, application state is captured. For instance, virtual memory pages and contents of a file system used by an application can be identified and saved to a persistent store as well as metadata regarding the stored data. At this point, the store contains a snapshot, or suspended form, of the application. At 530, the saved state, or snapshot, is transmitted to a machine or alternatively to a persistent store accessible by the machine for instance over a network such as the Internet At reference numeral 540, application state is restored on the machine utilizing directly transmitted state or state acquired from a store. For example, contents of memory can be restored at the same virtual addresses as previously with respect to a virtual environment and resources that are outside the address space of a virtual environment can be restored in accordance with the state including, for instance contents of a file system and threads. At numeral 550, application execution can be resumed. In other words, threads can start to execute as normally.

Numerous scenarios are enabled utilizing dynamic application migration as described herein. In one instance, migrating an application can afford a continuous computing experience. For example, an application can follow a user around by moving the application to a machine proximate to a user. In other words, an application started on a desktop computer at work can be migrated to a cellphone as the user leaves work and subsequently to the user's home computer when the user arrives at home.

In other instance, migration can be utilized to save power. Since running an application utilizes more power than displaying the application, an application can be migrated to a server and the application can simply be displayed on a user computer. For example, if a user is running an application on a power-constrained machine such as a laptop at a location where there is network access, the application can be migrated to a non-power-constrained machine such a server and the user can connected to the application using less power than if the application was running on the laptop. This may double or triple battery life. Subsequently, when the user moves to another location where there is no network access, the application can be migrated back to the laptop. For example, when a user closes a laptop and it begins to hibernate, the application can be migrated from the non-power-constrained machine to the hibernating laptop in order to be available in the laptop's new location. In both of these scenarios, because migration can be performed expeditiously, such as within a second or two, the migration will be imperceptible to users.

Migration can also save power across organizations. For example, if employees leave work with applications running on their desktop computers, applications can be migrated off desktops (e.g., after a predetermined period of user-inactivity) and consolidated on servers such that desktops can be powered down, either by turned off the desktop computer or initiating sleep mode on the desktop. In the morning, when a user comes back, applications can be migrated back to the user's desktop.

In another instance, migration can be utilized with respect to hardware and or software updates/upgrades. For example, suppose a patch needs to be installed to a computer and applications are still running. Conventionally, running applications are shut down, the patch is applied, and the computer is rebooted. With the ability to migrate individual applications, running applications can be written to a disk or moved to another machine prior to applying the patch. After the computer is rebooted, the applications can be restored.

Additionally, migration can be employed to perform automatic recovery. For instance, snapshots of a running application can be taken and written to a persistent store without terminating the application. If an application later fails for some reason (e.g., loss of power, defect . . . ), a snapshot can be utilized to restore the application to the last good running state. This can be utilized alone or in conjunction with convention automatic recover with respect to a file system. Given the small size of the snapshot and associated speed, it is possible to take a snapshot of running application every thirty seconds for example.

As used herein, the terms "component," "system," "architecture," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

The conjunction "or" as used this description and appended claims in is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'A' and 'B'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
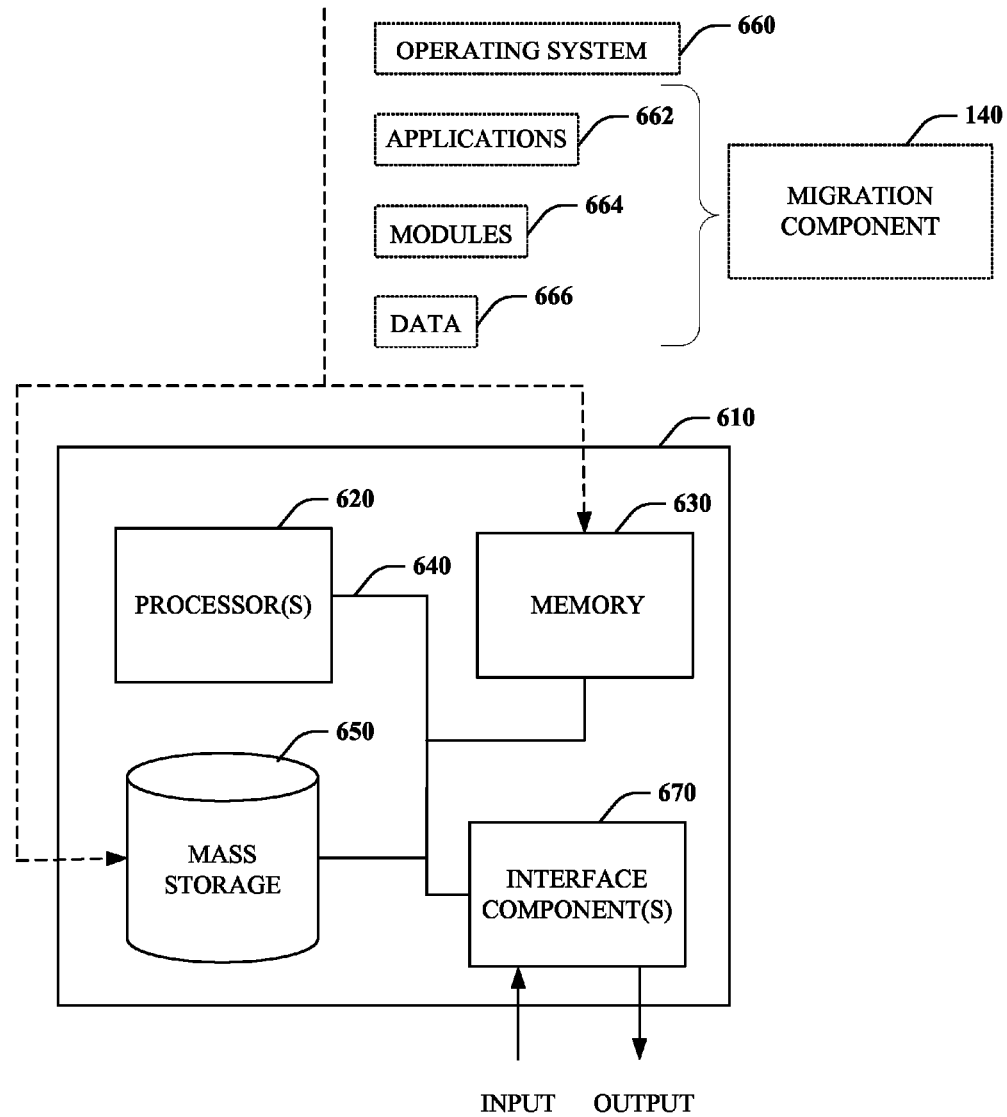
FIG. 6 is a schematic block diagram illustrating a suitable operating environment for aspects of the subject disclosure.

In order to provide a context for the claimed subject matter, FIG. 6 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 6, illustrated is an example general-purpose computer 610 or computing device (e.g., desktop, laptop, server, hand-held, programmable consumer or industrial electronics, set-top box, game system . . . ). The computer 610 includes one or more processor(s) 620, memory 630, system bus 640, mass storage 650, and one or more interface components 670. The system bus 640 communicatively couples at least the above system components. However, it is to be appreciated that in its simplest form the computer 610 can include one or more processors 620 coupled to memory 630 that execute various computer executable actions, instructions, and or components stored in memory 630.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration.

The computer 610 can include or otherwise interact with a variety of computer-readable media to facilitate control of the computer 610 to implement one or more aspects of the claimed subject matter. The computer-readable media can be any available media that can be accessed by the computer 610 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 610.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 630 and mass storage 650 are examples of computer-readable storage media. Depending on the exact configuration and type of computing device, memory 630 may be volatile (e.g., RAM), non-volatile (e.g., ROM, flash memory . . . ) or some combination of the two. By way of example, the basic input/output system (BIOS), including basic routines to transfer information between elements within the computer 610, such as during start-up, can be stored in nonvolatile memory, while volatile memory can act as external cache memory to facilitate processing by the processor(s) 620, among other things.

Mass storage 650 includes removable/non-removable, volatile/non-volatile computer storage media for storage of large amounts of data relative to the memory 630. For example, mass storage 650 includes, but is not limited to, one or more devices such as a magnetic or optical disk drive, floppy disk drive, flash memory, solid-state drive, or memory stick.

Memory 630 and mass storage 650 can include, or have stored therein, operating system 660, one or more applications 662, one or more program modules 664, and data 666. The operating system 660 acts to control and allocate resources of the computer 610. Here, the operating system 660 can correspond to a host operating system 210 able to support a number of library operating systems 134. Applications 662 include one or both of system and application software and can exploit management of resources by the operating system 660 through program modules 664 and data 666 stored in memory 630 and/or mass storage 650 to perform one or more actions. Accordingly, applications 662 can turn a general-purpose computer 610 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the migration component 140, or portions thereof, can be, or form part, of an application 662, and include one or more modules 664 and data 666 stored in memory and/or mass storage 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the migration component 140 and/or associated functionality can be embedded within hardware in a SOC architecture.

The computer 610 also includes one or more interface components 670 that are communicatively coupled to the system bus 640 and facilitate interaction with the computer 610. By way of example, the interface component 670 can be a port (e.g., serial, parallel, PCMCIA, USB, FireWire . . . ) or an interface card (e.g., sound, video . . . ) or the like. In one example implementation, the interface component 670 can be embodied as a user input/output interface to enable a user to enter commands and information into the computer 610 through one or more input devices (e.g., pointing device such as a mouse, trackball, stylus, touch pad, keyboard, microphone, joystick, game pad, satellite dish, scanner, camera, other computer . . . ). In another example implementation, the interface component 670 can be embodied as an output peripheral interface to supply output to displays (e.g., CRT, LCD, plasma . . . ), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
employing at least one processor configured to execute computer-executable instructions stored in memory to perform the following acts with one or more library operating system components:
suspending execution of an application executing in a virtual environment with a library operating system on a first machine; and
capturing state of the application.

2. The method of claim 1 further comprising transmitting the state from the first machine to a second machine.

3. The method of claim 2, transmitting the state from the first machine to a second machine proximate to a user.

4. The method of claim 2, transmitting the state from a first power-constrained machine to a second machine.

5. The method of claim 1 further comprising saving the state to a persistent store.

6. The method of claim 5 further comprising resuming execution of the application.

7. The method of claim 1 further comprising:
restoring the state of the application on the first machine; and
resuming execution of the application.

8. The method of claim 1, capturing the state from inside the virtual environment.

9. The method of claim 1, capturing the state comprises capturing a difference in the state since loading of the application.

10. The method of claim 1 further comprises initiating the suspending execution and the capturing state upon a predetermined period of user inactivity on the first machine, saving the state to a persistent store, and powering down the first machine.

11. The method of claim 1 further comprises initiating the suspending execution and the capturing state prior to an upgrade to hardware or software on the first machine.

12. The method of claim 11 further comprises restoring the application on the first machine and resuming execution of the application after the first machine is restarted.

13. A system, comprising:
a processor coupled to a memory, the processor configured to execute the following computer-executable library operating system components stored in the memory:
a first component configured to suspend execution of an application executing within a virtual environment with a library operating system on first machine; and
a second component configured to capture application state.

14. The system of claim 13 further comprises a third component configured to make the state available to a second machine.

15. The system of claim 14, the third component is configured to save the state to a data store accessible by the second machine.

16. The system of claim 13 further comprises:
a third component configured to restore the state of the application; and
a fourth component configured to resume execution of the application.

17. The system of claim 13, the first component and the second component form part of a library operating system interface configured to enable interaction between the library operating system and a host operating system.

18. A method, comprising:
employing at least one processor configured to execute computer-executable instructions stored in memory to perform the following acts with one or more library operating system components:

restoring state of an application on a first machine within a virtual environment including an library operating system; and resuming execution of the application within the virtual environment on the first machine.

19. The method of claim 18 further comprises restoring the state and resuming execution of the application from within the virtual environment utilizing a library operating system interface configured to enable interaction between the library operating system and a host operating system.

* * * * *